United States Patent
Tiffin et al.

[15] 3,697,126
[45] Oct. 10, 1972

[54] REINFORCED FOAM HEADLINER

[72] Inventors: James R. Tiffin, Newark; David C. Trimble, Yorklyn, both of Del.

[73] Assignee: Haskon, Inc., Wilmington, Del.

[22] Filed: Feb. 19, 1971

[21] Appl. No.: 117,088

[52] U.S. Cl. ............... 296/137 A, 161/160, 161/161, 161/165
[51] Int. Cl. ........ B62d 25/06, B32b 3/26, B32b 7/02
[58] Field of Search...296/137 A; 161/160, 161, 165, 161/166

[56] References Cited

UNITED STATES PATENTS

| | | | |
|---|---|---|---|
| 3,042,446 | 7/1962 | Stahl | 296/137 A |
| 3,252,732 | 5/1966 | Squier | 296/137 A |
| 3,506,532 | 4/1970 | Bock et al. | 161/161 |
| 3,565,746 | 2/1971 | Stevens | 161/160 |

*Primary Examiner*—William J. Van Balen
*Attorney*—Sheldon F. Raizes

[57] ABSTRACT

A foam headliner for a vehicle is provided which comprises a wire mesh support sandwiched between two laminated layers of cross-linked ethylene or propylene homopolymer or copolymer foam, one layer being thicker than the other. A composite of a polyvinyl chloride homopolymer or copolymer foam and a decorative solid polyvinyl chloride homopolymer or copolymer film layer is laminated to the thick layer of cross-linked foam. The cross-linked foam is for energy absorption and the vinyl foam is to prevent the vinyl film from developing creases when the headliner is flexed during handling or installation. The wire mesh is for keeping the headliner from sagging between points of support. The wire mesh may be designed to be more flexible about one axis than the one transverse thereto to prevent deforming premolded areas of the headliner when handling or installing the headliner.

10 Claims, No Drawings

REINFORCED FOAM HEADLINER

It is an object of this invention to provide a headliner for a vehicle which is capable of absorbing energy, is self-supporting, is capable of bending for assembly and is attractive and retains its serviceability between about 250° F. and −30° F., the specific range depending upon the type of homopolymer or copolymer used.

Other objects of the invention will become apparent from the following description. The headliner comprises an inner layer of closed cell cross-linked foam, a primary layer of closed cell cross-linked foam, a layer of closed cell polyvinyl chloride foam, a layer of solid polyvinyl chloride film and a wire mesh support sandwiched between the layers of the cross-linked foam. The cross-linked foam layers may be any one of either ethylene or propylene homopolymers or copolymers such as low density polyethylene, linear polyethylene, stereoregular polypropylene, and ethylene-propylene copolymer. These materials may be modified by the addition of other monomers. A preferred polymer is low density polyethylene. Low density polyethylene has a specific gravity of less than 0.925 and linear polyethylene has a specific gravity of at least 0.935. This headliner may be attached to a roof of an automobile by any well known means such as by the use of a peripheral molding attached to the sides of the roof by any well known means and may be attached to the front and rear of the roof by rubber bushings.

The primary purpose of the cross-linked polyethylene foam in the headliner is to absorb energy at temperature ranges between 215° F. and −30° F. in the event that a person strikes the roof of the vehicle thus reducing the degree of injury or injury to the person. The overall total thickness of the cross-linked foam layers should be in a range from about 120 mils to about 575 mils and the density should be in a range from one-half to 15 pounds per cubic foot, preferably from 1 to 6 pounds per cubic foot.

The foam is cross-linked to the extent that it will maintain its integrity and serviceability at about 215° F. In other words the foam should not sag, blister or delaminate at this temperature. The specific process conditions such as time, temperature, and polymer may affect the degree of cross-linking that may be required. For instance, a material with a given degree of cross-linking under one set of processing conditions may give substantially different results than the same material cross-linked to the same degree under a different set of processing conditions. The flexible wire mesh is provided for the purpose of supporting the central portion of the headliner between the peripheral moulding or in other words keeping the central portion from sagging without having to additionally fasten the same to the roof. If additional fasteners are desired, only a few will be needed due to the employment of the wire mesh. The spacing between longitudinal wires is equal to the spacing between the transverse wires whereby the mesh includes square openings.

The wire mesh 20 is constructed to be flexible enough to bend and still return to its original position and yet is rigid enough to keep the headliner from sagging between the moulding supports or any additional supports if utilized. The mesh support is laminated between the cross-linked foam layers. The inner layer in addition to serving a purpose as an energy absorber also serves to lock the wire mesh to the primary layer of cross-linked foam when flexed during installation and prevents noise from metal to metal contact between the wire mesh and the roof of a vehicle. The inner cross-link foam layer is relatively thin compared to the primary cross-linked foam layer and usually ranges in thickness from 20 to 75 mils, preferably 35 to 60 mils. The primary layer usually ranges in thickness from 100 to 500 mils, preferably 150 to 275 mils. The thicker primary layer is on the interior side of the vehicle. During installation, the headliner is flexed into a generally U-shape, inserted into a vehicle through a door and allowed to return to its original form and snapped into position under the roof. The primary layer is on the concave side of headliner when flexed. Having the thicker layer on the concave side prevents one from creating too sharp a radius on the wire mesh during installation whereby the mesh will set and not fully return to its original form and the compression in the thick primary layer will tend to force the wire mesh back to its original form in instances where the mesh may not want to fully return thereto.

The vinyl film is provided for decorative purposes as well as protecting the cross-linked foam layers. Flexing of the headliner during installation and forming of the headliner has caused creases in the vinyl film. It was found that by utilizing a composite vinyl film, vinyl foam laminated to the primary cross-linked foam layer, this problem was eliminated under normal handling and forming. The vinyl foam can have a density of from 5 to 50 pounds per cubic foot, preferably 10 to 25 pounds per cubic foot, and be from 6 to 30 mils thick, preferably 10 to 20 mils, while the film 18 can be from 2 to 10 mils thick, preferably 2 to 6 mils, for sufficient flexibility.

The headliner is fabricated by well known laminating techniques. For instance, the cross-linked foam layers, and wire mesh are simultaneously fed between a pair of pressure rolls which apply pressure to bond the confronting surfaces of the cross-linked foam layers which have either had an adhesive applied thereto or have been heated to a tacky state. The composite vinyl foam and the vinyl film member is laminated to the primary layer by sending the laminated component of the inner and primary layers and wire mesh and the composite member of the vinyl film, vinyl foam through a pair of pressure rolls after applying a compatible adhesive to the confronting faces.

It is not necessary that the cross-linked foam layers be of the same density as long as the properties of the total thickness of these layers meet required specifications. Also, the vinyl foam layer does not have to be the same density as the primary layer.

The invention may be modified by having the spacing of the wire mesh greater in the transverse direction than in the longitudinal direction. This makes the wire more flexible about the transverse axis than the longitudinal axis. This is desirable when the headliner has been moulded and thus curved prior to installation. In the case of an automobile, the moulded portions will usually be across the front and rear portions. Bending about the longitudinal axis could impair the moulded sections. This wire construction resists bending about the longitudinal axis but allows bending about the transverse axis for flexing during installation.

Obviously, the headliner described herein could be used for vehicles other than automobiles.

What we claim and desire to protect by Letters Patent is:

1. In combination with a vehicle having a roof structure, a composite headliner comprising: a first layer of closed cell cross-linked foam, a second layer of closed cell cross-linked foam adhered to said first layer, said foam comprising a polymer selected from the group consisting of ethylene or propylene homopolymers or their copolymers, said first and second layers including a flexible wire mesh located at about the plane of juncture therebetween, said second layer being thicker than said first layer, a third layer of closed cell foam bonded to said second layer and a fourth layer of a solid film adhered to the said third layer, said third and fourth layers comprising a polymer selected from the group consisting of polyvinyl chloride homopolymers and copolymers thereof, said first layer being adjacent said roof structure, said first and second layers having a density range of about one-half to 15 pounds per cubic foot and having a combined thickness range of about 120 mils to 575 mils, said third layer of foam being in a density range of about 5 to 50 pounds per cubic foot and having a thickness range of about 6 to 30 mils, said film having a thickness range of about 2 to 10 mils.

2. The structure as recited in claim 1 wherein said cross-linked foam comprises a polymer selected from the group consisting of low density polyethylene, linear polyethylene, and stereoregular polypropylene and any of their copolymers.

3. The structure as recited in claim 1 wherein said cross-linked foam comprises low density polyethylene.

4. The structure as recited in claim 3 wherein the thickness of said first layer is between about 20 to 75 mils and the thickness of said second layer is between about 100 to 500 mils.

5. The structure as recited in claim 1 wherein said wire mesh is more flexible for bending about one axis than for bending about an axis transverse to said one axis.

6. The structure as recited in claim 4 wherein said first and second layers are of the same density.

7. The structure as recited in claim 4 wherein said wire mesh is more flexible for bending about one axis than for bending about an axis transverse to said one axis.

8. The structure as recited in claim 1 wherein said cross-linked foam comprises low density polyethylene, said third and fourth layers comprises polyvinyl chloride, and combined thickness range of said first and second layers is between 185 and 335 mils and the density thereof is between 1 and 6 pounds per cubic foot, the thickness range for the third layer is between 10 and 20 mils and the density thereof between 10 and 25 pounds per cubic foot, and the thickness range of the fourth layer is between 2 and 6 mils.

9. The structure as recited in claim 8 wherein the thickness range of said first layer is between 35 and 60 mils and the thickness range of said second layer is between 150 and 275 mils.

10. The structure as recited in claim 9 wherein said wire mesh is more flexible for bending about one axis than for bending about an axis transverse to said one axis.

* * * * *